US009911337B1

(12) United States Patent
Shapiro

(10) Patent No.: US 9,911,337 B1
(45) Date of Patent: Mar. 6, 2018

(54) INTEGRATING INFORMATION FROM CONTROLLER TO PILOT DATA LINK COMMUNICATION (CPDLC) MESSAGES

(75) Inventor: Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1382 days.

(21) Appl. No.: 12/381,541

(22) Filed: Mar. 13, 2009

(51) Int. Cl.
*G06F 7/70* (2006.01)
*G08G 5/00* (2006.01)

(52) U.S. Cl.
CPC ......... *G08G 5/0013* (2013.01); *G08G 5/0026* (2013.01); *G08G 5/0043* (2013.01); *G08G 5/0082* (2013.01)

(58) Field of Classification Search
CPC .. G08G 5/0013; G08G 5/0026; G08G 5/0043; G08G 5/0082; G08G 5/065
USPC .......... 701/1, 120; 340/945, 963; 455/404.1, 455/412.2
See application file for complete search history.

(56) References Cited

U.S. PATENT DOCUMENTS 3,750,166 A * 7/1973 Dearth ............................ 342/30
6,828,921 B2 * 12/2004 Brown et al. ................. 340/945
7,012,553 B2 * 3/2006 Hedrick ................. G01C 23/00 340/945
7,414,545 B2 * 8/2008 Vickas .......................... 340/953
2008/0163093 A1 * 7/2008 Lorido ................... G01C 23/00 715/771
2008/0167885 A1 * 7/2008 Judd et al. ........................ 705/1
2008/0195309 A1 * 8/2008 Prinzel, III ............ G01C 23/00 701/532

* cited by examiner

*Primary Examiner* — Michael C McCullough
*Assistant Examiner* — Kalyanavenkateshware Kumar
(74) *Attorney, Agent, or Firm* — Angel N. Gerdzhikov; Donna P. Suchy; Daniel M. Barbieri

(57) ABSTRACT

The present invention is a flight deck situational awareness communication system for providing integrated controller to pilot data link communication (CPDLC) message function for an aircraft. The system includes a memory configured for receiving and storing a CPDLC message from a communicatively coupled remote CPDLC communication system. The flight deck system further includes a processor. The processor is communicatively coupled with the memory and configured for receiving the CPDLC message stored in the memory. The processor is further configured for generating an image including a depiction of the content of the received CPDLC message overlaid onto an application depiction. The processor is communicatively coupled with a display and provides the image to the display. The display is configured for receiving and displaying the image.

15 Claims, 7 Drawing Sheets

INTEGRATING INFORMATION FROM CONTROLLER TO PILOT DATA LINK COMMUNICATION (CPDLC) MESSAGES

FIELD OF THE INVENTION

The present invention relates to the field of flight deck communication systems (ex.—Flight Deck Human-Machine Interface (HMI) systems) and particularly to a system and method for providing integrated controller to pilot data link communications (CPDLC) message function.

BACKGROUND OF THE INVENTION

Current flight deck communication systems may not provide a desired level of performance.

Thus, it would be desirable to provide a flight deck communication system which obviates problems associated with current solutions.

SUMMARY OF THE INVENTION

Accordingly, an embodiment of the present invention is directed to a method for providing integrated controller to pilot data link communication (CPDLC) message function via a flight deck situational awareness communication system of an aircraft, said method including: providing an application depiction; receiving a CPDLC message from a remote CPDLC communication system, the remote CPDLC communication system being communicatively coupled with the aircraft flight deck situational awareness communication system; providing an alert to a user of the aircraft flight deck situational awareness communication system that the CPDLC message has been received by the aircraft flight deck situational awareness communication system; and when a user input responsive to the alert is received by the aircraft flight deck situational awareness communication system, updating the application depiction and providing a depiction of content of the received CPDLC message, wherein the depiction of content of the CPDLC message is overlaid onto the updated application depiction.

An additional embodiment of the present invention is directed to a computer program product, including: a signal-bearing medium bearing one or more instructions for performing a method for providing integrated controller to pilot data link communication (CPDLC) message function via a flight deck situational awareness communication system of an aircraft, said method including: providing an application depiction; receiving a CPDLC message from a remote CPDLC communication system, the remote CPDLC communication system being communicatively coupled with the aircraft flight deck situational awareness communication system; providing an alert to a user of the aircraft flight deck situational awareness communication system that the CPDLC message has been received by the aircraft flight deck situational awareness communication system; and when a user input responsive to the alert is received by the aircraft flight deck situational awareness communication system, updating the application depiction and providing a depiction of content of the received CPDLC message, wherein the depiction of content of the CPDLC message is overlaid onto the updated application depiction.

A further embodiment of the present invention is directed to a flight deck situational awareness communication system for providing integrated controller to pilot data link communication (CPDLC) message function for an aircraft, said system including: a memory configured for receiving and storing a CPDLC message from a remote CPDLC communication system, the remote CPDLC communication system being communicatively coupled with the aircraft flight deck situational awareness communication system; a processor configured for being communicatively coupled with the memory, the processor further configured for receiving the CPDLC message stored in the memory, the processor further configured for generating an image, said image including a depiction of the content of the received CPDLC message overlaid onto an application depiction, the processor further configured for providing the image to the display; and a display configured for being communicatively coupled with the processor, the display being further configured for receiving the image from the processor and displaying the image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Controller to Pilot Data Link Communications (CPDLC) is an application designed to connect pilots and air traffic controllers via a text interface. Controllers may send messages to pilots, and vice versa. For example, a controller may send a message to a pilot which includes a request asking the pilot to alter the flight path of the pilot's aircraft. Because current CPDLC implementation is a stand-alone application, when the pilot receives the air traffic controller's message, the pilot must open other applications (ex.—a map application, a weather application, a traffic application, etc.) in order to gather information which may be necessary for allowing the pilot to make an informed decision as to whether or not to comply with the air traffic controller's request. This process of opening other applications may be time-consuming and may require the pilot to complete several tasks in order to make an informed decision. Thus, the present invention provides a flight deck communication system/method which may allow a pilot/flight crew member to make an informed decision regarding a CPDLC communication provided by an air traffic controller without having to first go through the time-consuming process of opening other applications/completing several tasks. Further, the present invention provides a system and method for providing integrated controller to pilot data link communications (CPDLC) message function which may reduce pilot workload when said pilot is responding to said air traffic controller requests and may further improve pilot response time (which may be critical in certain environments, such as in Aeronautical Telecommunications Network (ATN) airspace).

Referring generally to FIGS. 1-6, a flight deck situational awareness communication system for providing integrated controller to pilot data link communication (CPDLC) message function for an aircraft in accordance with exemplary embodiments of the present invention is shown.

Figure 1:
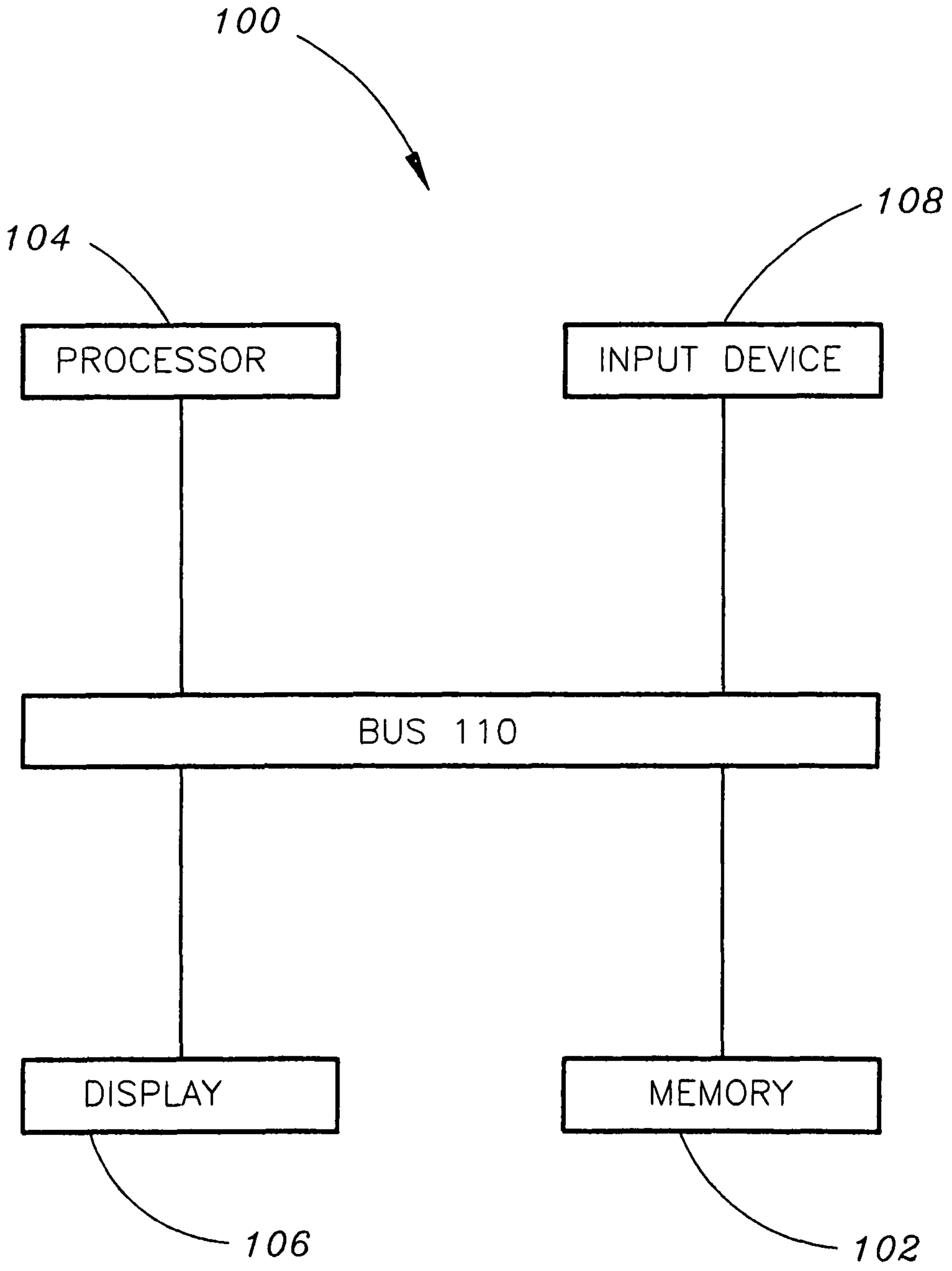
FIG. 1 is a block diagram schematic of a flight deck situational awareness communication system for providing integrated controller to pilot data link communication (CPDLC) message function for an aircraft in accordance with an exemplary embodiment of the present invention.

Referring generally to FIG. 1, a block diagram schematic of a system, such as a flight deck situational awareness communication system (ex.—a Synthetic Vision Systems (SVS) system, a Flight Management System (FMS), an Enhanced Vision Systems (EVS) system, or the like), for providing integrated controller to pilot data link communication (CPDLC) message function for an aircraft (ex.—such as the aircraft implementing the system 100) in accordance with an exemplary embodiment of the present invention is shown. In the illustrated embodiment, the system 100 includes a memory 102. The memory 102 may be configured for storing various aircraft navigation information for the aircraft, such as: positional information for the aircraft (ex.—a current location of the aircraft, a current altitude of the aircraft, a current heading/trajectory of the aircraft); performance information for the aircraft (ex.—a current airspeed of the aircraft, a current vertical speed of the aircraft, a current acceleration of the aircraft, current aircraft loading information, a current aircraft weight, and/or various performance characteristics of the aircraft); navigational environment information for the aircraft (ex.—a current wind speed in a vicinity of the aircraft, a current wind direction of wind in the vicinity of the aircraft); approach path information (ex.—prescribed glide path/glide slope information/data for various runways/approaches/approach paths, or the like); landing area information (ex.—runway location/runway dimension information/data, runway ID data/information); and terrain information (ex.—information/data regarding terrain/obstacle locations and characteristics). In further embodiments, the system 100 is configured for providing Future Air Navigation System (FANS) functionality and/or Crew Alerting System (CAS) functionality.

In exemplary embodiments, the memory 102 of the system 100 may be configured for dynamically receiving, storing and updating one for more of the above-mentioned types of data/information in real time (ex—via inputs to the memory 102, said inputs provided by one or more input devices 108, such as aircraft sensors, antennas, Global Positioning System (GPS) devices, Inertial Reference System devices, or the like which may be communicatively coupled to the memory 102). In further embodiments of the present invention, the memory 102 may be further configured for receiving and storing CPDLC message(s), such as CPDLC messages provided by an air traffic controller (ex.—Air Traffic Control (ATC) messages). For example, the air traffic controller may direct/send messages via a remote CPDLC communication system (which may be located at an air traffic control tower) to the system 100 of the present invention (which may be located on-board an aircraft and may be communicatively coupled to the remote CPDLC communication system). In additional embodiments of the present invention, the memory 102 may be further configured for receiving and storing CPDLC messages provided to the system 100 via a user input provided by a user of the system 100 (ex.—such as a flight crew member located on-board the aircraft implementing the system 100). The user input may be provided via an input device 108, such as a keypad, mouse, microphone, and/or the like. Alternatively, the user input may be provided via touch screen entry via a communicatively coupled display 106.

In the illustrated embodiment, the system 100 further includes a processor 104. The processor 104 is configured for being communicatively coupled with the memory 102 and is further configured for receiving the above-referenced aircraft navigation information/data/messages (ex.—CPDLC messages) which may be stored in the memory 102. The processor 104 may be further configured for generating depiction(s)/images based upon the received aircraft navigation information/data/messages (ex.—CPDLC messages) received from memory 102. In exemplary embodiments, the processor may be configured for generating an application depiction based on said info/data, etc. For example, the application depiction may be a map application depiction, such as a Flight Management System (FMS) map application depiction, which may show current positional information and a current flight route for the aircraft implementing the system 100. Alternatively, the application depiction may be a traffic depiction, which may provide information regarding the presence/absence of other aircraft in the vicinity of/along a flight route of the aircraft implementing said system 100. Further, the application depiction may be a weather application depiction, which may provide weather information in the vicinity of/along a flight route of the aircraft implementing said system 100. In additional embodiments, the processor 104 may be configured for generating a depiction based on CPDLC message(s) received by the system 100. For instance, the processor 104 may be configured for generating a depiction/image in which a depiction of content of a received CPDLC message is overlaid onto an application depiction. Further, the processor 104 may be configured for receiving/dynamically (ex.—in real time) receiving the updated aircraft navigation information/data/CPDLC messages from the memory 102 and for dynamically updating the above-referenced depiction(s)/images.

In further embodiments, the system 100 may include a display 106 (ex.—a glass cockpit display). The display 106 may be configured for being communicatively coupled with the processor 104. The display 106 may be further configured for receiving the above-referenced depiction(s)/images (ex.—which are shown in FIGS. 2 through 6) which is/are output to the display 106 from the processor 104. The display 106 may be further configured for displaying the depiction(s)/image(s)/screenshot(s). In further embodiments, the display 106 may be communicatively coupled with the memory 102, such that pilot/flight crew member-provided information may be provided to the memory 102 via a display input mechanism of the display 106, such as via a touch screen of the display 106. Still further, one or more of the memory 102, the processor 104, the display 106, and the input devices 108 may be communicatively coupled via a bus 110. Further, the display 106 may be configured for dynamically receiving and displaying updated depiction(s)/images from the processor 104 based on updated aircraft navigation information/data/messages received by the system 100. In exemplary embodiments, depictions which may be provided to the display 106/displayed via the display 106 are shown in FIGS. 2 through 6.

Figure 2:
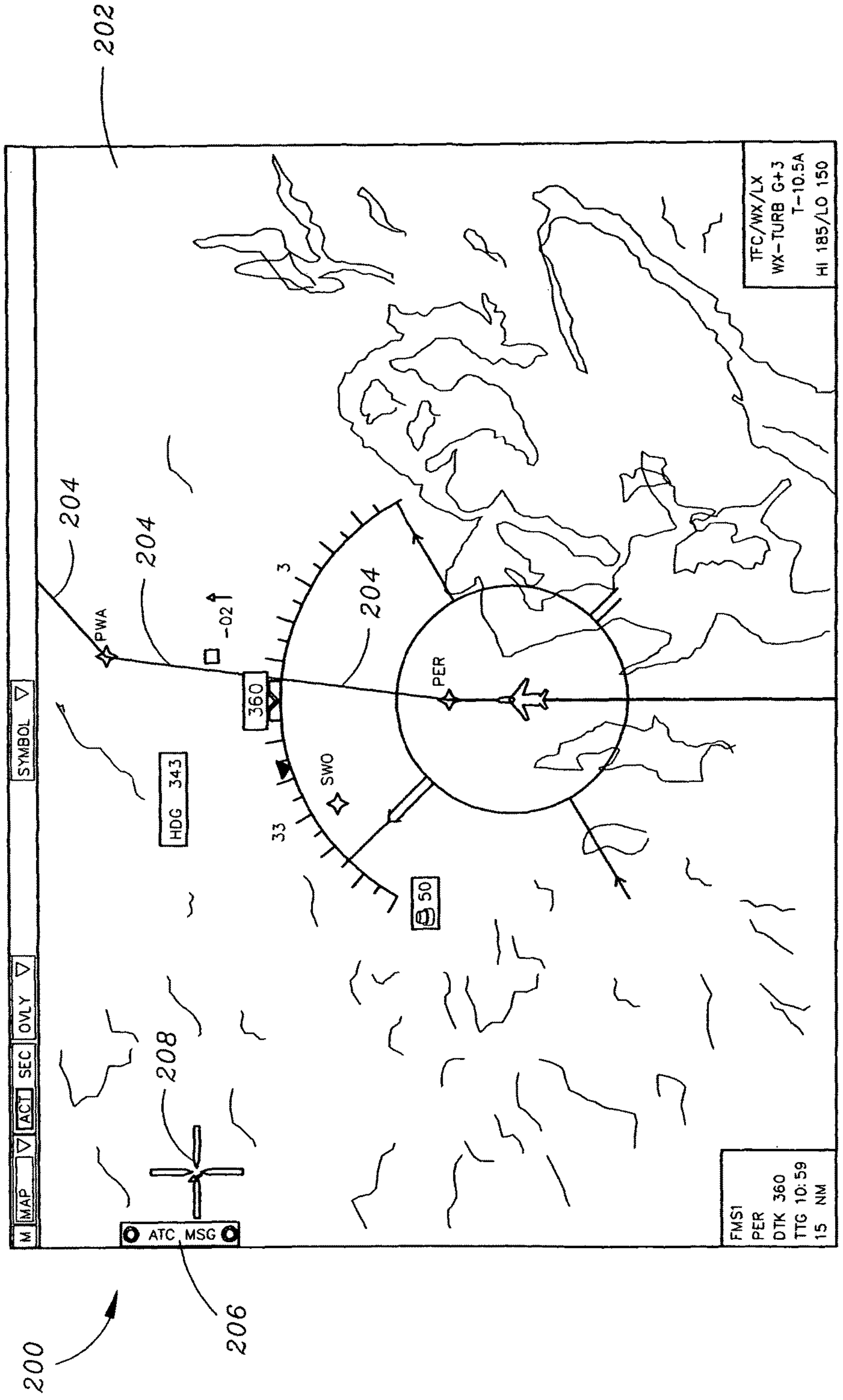
FIG. 2 is a screenshot provided/displayed by the system of the present invention, said screenshot including an application depiction (ex.—a map application depiction, such as a Flight Management System (FMS) map application depiction) and an alert indicator in accordance with an exemplary embodiment of the present invention.
Figure 3:
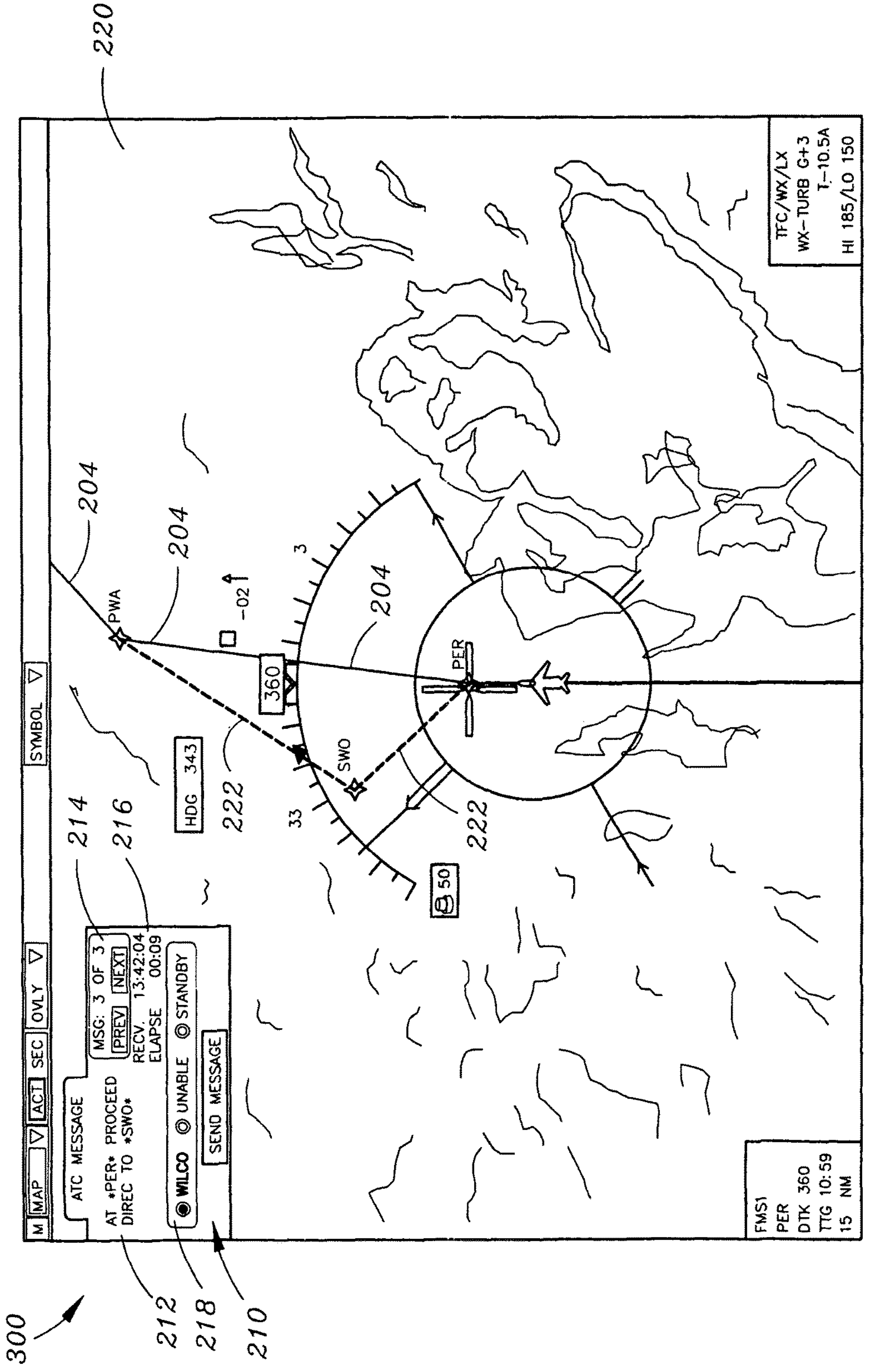
FIG. 3 is a screenshot provided/displayed by the system of the present invention, said screenshot including a depiction of received CPDLC message content (ex.—request) overlaid onto an application depiction/updated application depiction in accordance with an exemplary embodiment of the present invention.
Figure 7:
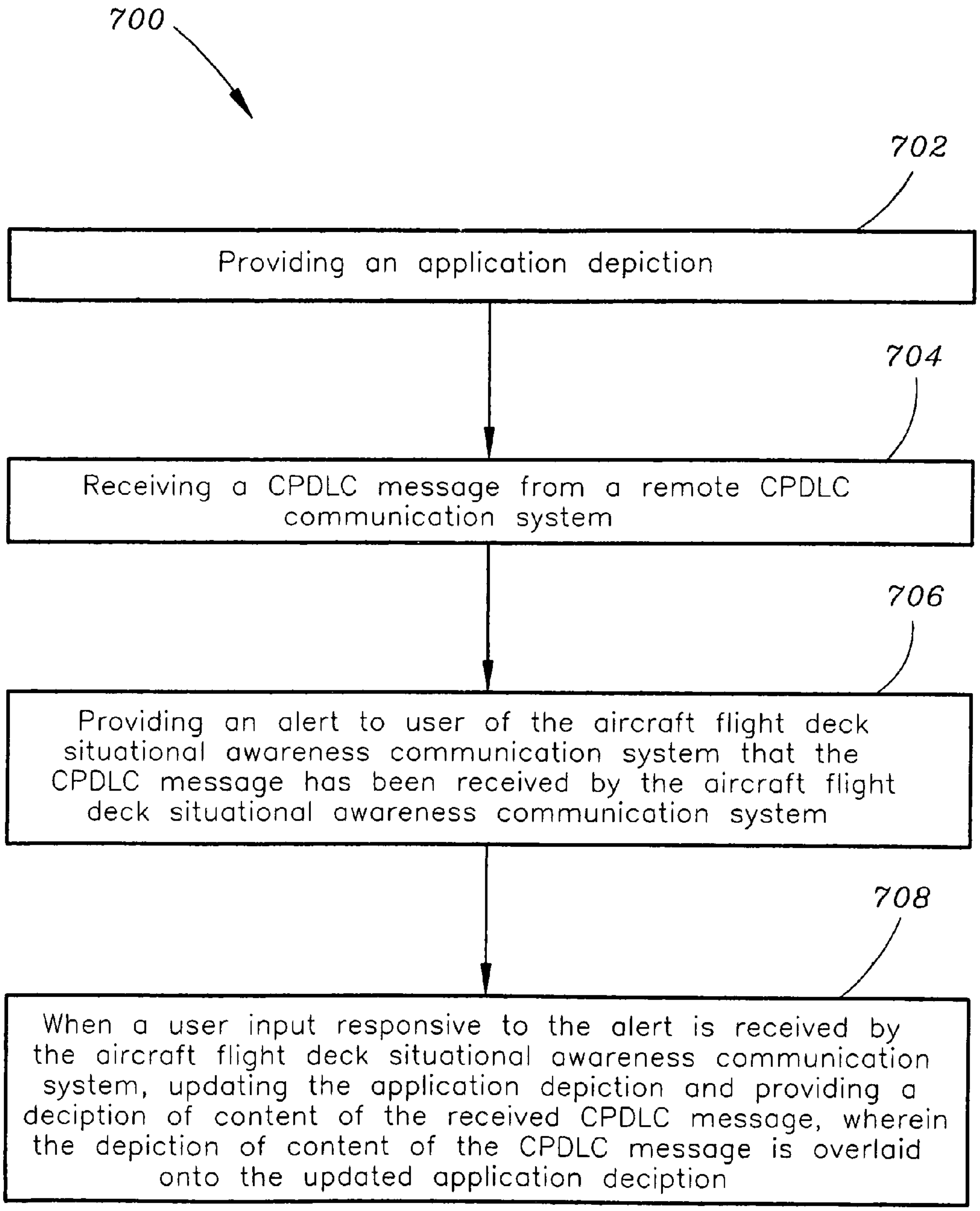
FIG. 7 is a flowchart illustrating a method for providing integrated controller to pilot data link communication (CP- DLC) message function via a flight deck situational awareness communication system of an aircraft in accordance with an exemplary embodiment of the present invention.

Referring to FIG. 7, a flowchart illustrating a method for providing integrated controller to pilot data link communication (CPDLC) message function via a flight deck situational awareness communication system of an aircraft is shown. In an exemplary embodiment, the method 700 may include the step of providing an application depiction 702. For example, when a pilot of the aircraft has already logged into FANS and is navigating the aircraft to its destination (i.e., the aircraft is enroute to its destination), the system 100 of the present invention may provide/generate/display an application depiction 202, such as a map application depiction (as shown in FIG. 2, which is a screenshot 200 provided by a display 106 of the system 100, said screenshot including said application depiction/map application depiction 202), based on navigation information for the aircraft. As mentioned above, the map application depiction 202 may show current positional information and a current planned flight route 204 for the aircraft implementing the system 100, all plotted out on a map, which may be any of a number of various sizes, such as a full screen map, a half screen map, etc. In further embodiments, the application depiction may be a traffic depiction, a weather depiction, or the like. Still further, the application depiction 202 may be dynamically updated by the system 100 to monitor current conditions/location for the aircraft.

In exemplary embodiments of the present invention, the method 700 may further include the step of receiving a CPDLC message from a remote CPDLC communication system 704, the remote CPDLC communication system being communicatively coupled with the aircraft flight deck situational awareness communication system 100. For example, the CPDLC message may be sent from an air traffic controller at a ground-based air traffic control station to the on-board aircraft system 100 (ex.—may be an Air Traffic Control (ATC) message). Further, the CPDLC message may be/may include a request. For instance, the request may include a direction or suggestion directing a flight crew member/pilot to complete a task (ex.—to change the navigational course of the aircraft), such as to avoid other aircraft, poor weather conditions, etc. As mentioned above, the CPDLC message, once received by the system 100 may be stored in the memory 102.

In current embodiments of the present invention, the method 700 may further include providing an alert to a user of the aircraft flight deck situational awareness communication system that the CPDLC message has been received by the aircraft flight deck situational awareness communication system 706. For instance, the alert may be a graphical indicator 206 (ex.—a Crew Alerting System (CAS) message/CAS graphical indicator), such as a small message bar labeled “ATC Message”, which may be provided by the system 100 as an overlay on the application depiction/map application depiction 202. However, as shown in FIG. 2 of the present invention, the graphical indicator 206 may be inconspicuously positioned/overlaid onto the map application depiction 202 so as not to occlude the displayed map application depiction 202. Further, the message bar/graphical indicator 206 may include a flashing portion (ex.—two flashing circles) for directing attention of a pilot/flight crew member/user of the system to the message bar/indicator 206. In additional embodiments, an additional alert, such as an aural alert/tone may be provided via an output device (ex.—a speaker 112) of the system 100, for further promoting awareness of a user of the system to the presence of the received message.

In further embodiments of the present invention, when a user input responsive to the alert is received by the aircraft flight deck situational awareness communication system 100, the method 700 may further include updating the application depiction and providing a depiction of content of the received CPDLC message, the depiction of content being overlaid onto the updated application depiction 708. For example, after seeing the alert/graphical indicator 206 signifying that the system 100 has received a CPDLC message, a user of the system 100, such as a flight crew member/pilot may provide a user input, such as via a user input device 108, or by a touch screen input via the display 106, said user input being responsive to the alert. An exemplary way of providing the user input may involve positioning a cursor 208 on the graphical indicator 206 and selecting the graphical indicator (such as via a click of a cursor control device (ex.—a mouse)). The user input may be a way of indicating to the system 100 that the user wants to see/receive/open the content of the received CPDLC message. As mentioned above, when the system 100 receives the user input, the system 100 may be configured for updating the application depiction, and providing a depiction of content of the received CPDLC message which is overlaid onto the updated application depiction (as shown in the screenshot 300 illustrated in FIG. 3). For instance, the depiction of the received CPDLC message content 210 may be displayed via a graphical window, tab, or drop-down menu which opens/is displayed when the user input is received. The depiction of the content 210 may include text of a request 212 (ex.—text of an ATC request) included in the received CPDLC message. For example, the request may be for the pilot to navigate the aircraft to a certain location, or along a certain route specified by the air traffic controller.

In current embodiments of the present invention, the depiction of the content 210 may further include a message history 214, indicating that a current message (the text of which is currently displayed) may be one of a plurality of CPDLC messages which have been received by the system. Further, the message history 214 may include/display one or more buttons/arrows which may be selected by a user to page or scroll between previously read messages and those messages which have been received by the system, but have yet to be read/displayed/selected by the user. The message history 214 may further provide a text indication of a time at which the message currently being displayed by said system 100 was received by said system 100 and may further provide a text indication (such as via an elapsed time counter 216) of an amount of time which has elapsed/is elapsing since the text of the message currently being displayed by said system 100 was received by the system 100.

In exemplary embodiments of the present invention, the content depiction 210 may further include a list of possible responses to the ATC request/response entries 218. For instance, the list 218 may include an accept response (ex.—"WILCO"), a reject response (ex.—"UNABLE"), and a standby response (ex.—"STANDBY"). The content 210 may further include a selection entry (ex.—a SEND MESSAGE button) for allowing a user of the system 100 to provide a confirmation input to the system, said confirmation input may cause the system 100 to generate/forward/provide a response CPDLC message based upon the user input responsive to said request, said CPDLC message including/indicating the user's response to the air traffic controller/remote system.

As mentioned above, the content depiction 210 may be overlaid onto the updated application depiction 220. For example, whereas the application depiction 202 (ex.—map application) may include positional and location information for the aircraft and a planned flight route 204 for the aircraft, the updated application depiction 220 may be an updated map application depiction which may include updated position and location information for the aircraft, the planned flight route/currently planned flight route 204 for the aircraft, but also a proposed (ex.—modified) flight route for the aircraft 222 (ex.—an ATC-proposed flight route) for the aircraft. The proposed flight route 222 may be based on the received CPDLC message/request and may indicate a path along which the aircraft would be directed if the ATC request in the received CPDLC message/received ATC message were followed by the flight crew member/pilot of the aircraft. For instance, the updated map application depiction may indicate deviations of the proposed flight route from the planned flight route in a lateral direction(s) and/or a vertical direction(s) (ex.—may provide vertical guidance and/or lateral/horizontal guidance). The proposed flight route 222/proposed flight route graphic may be autoloaded by the system 100 if the CPDLC message/request is accepted by the user of the system 100.

Figure 4:
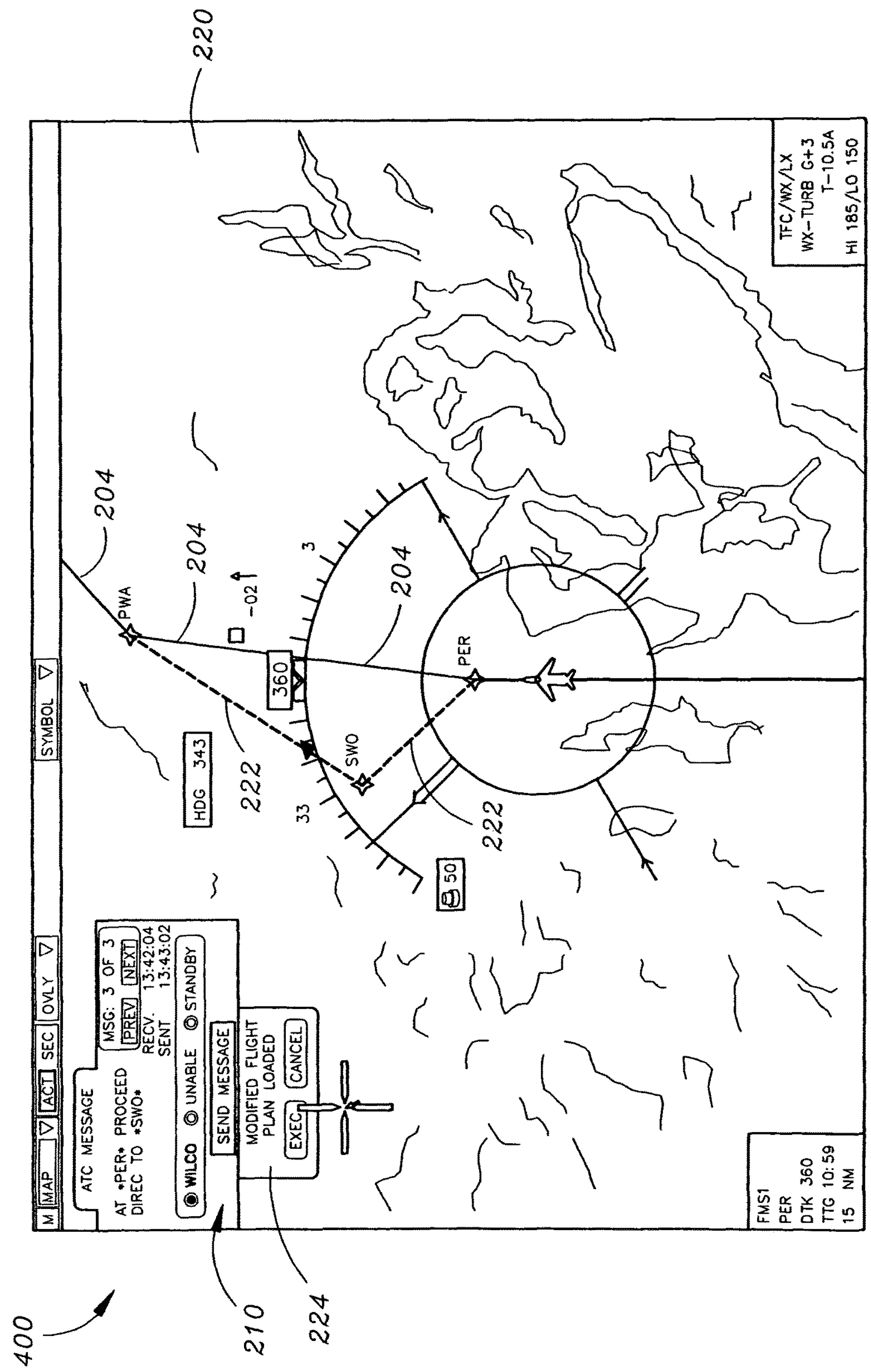
FIG. 4 is a screenshot provided/displayed by the system of the present invention, said screenshot including a depiction of received CPDLC message content and a proposed flight route confirmation prompt overlaid onto an application depiction/updated application depiction in accordance with an exemplary embodiment of the present invention.
Figure 5:
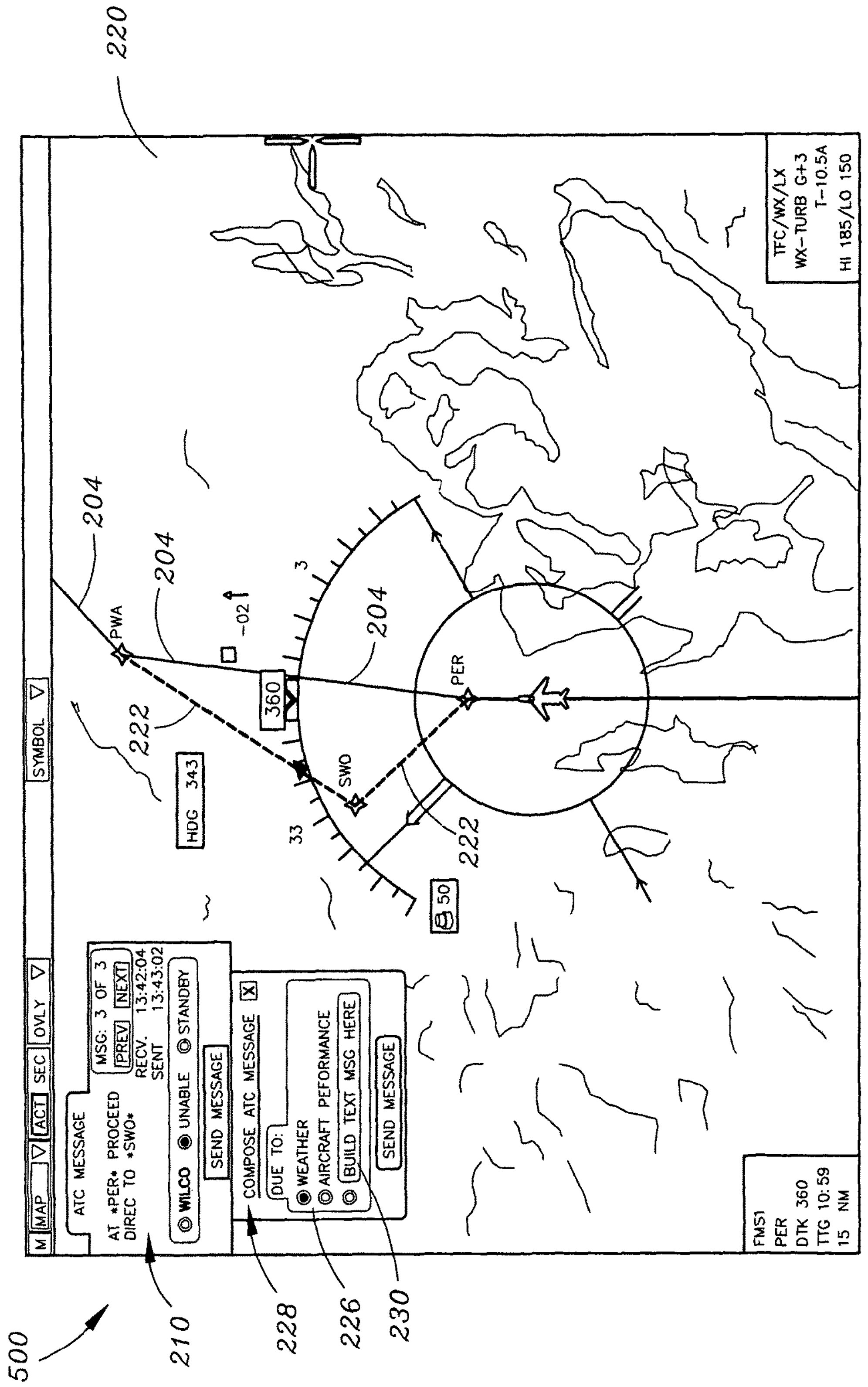
FIG. 5 is a screenshot provided/displayed by the system of the present invention, said screenshot including a depiction of received CPDLC message content and a request non-acceptance reason prompt overlaid onto an application depiction/updated application depiction in accordance with an exemplary embodiment of the present invention.
Figure 6:
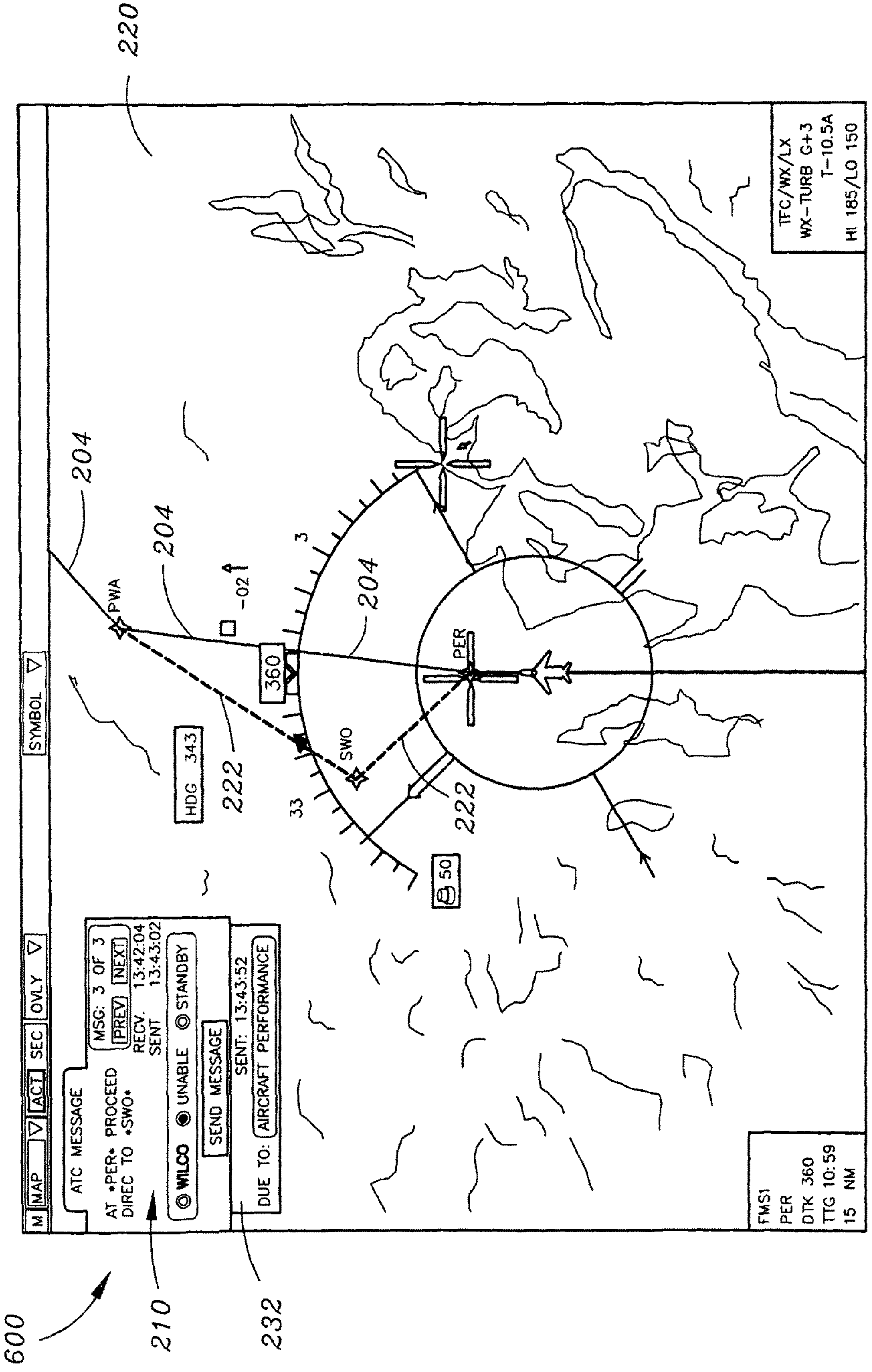
FIG. 6 is a screenshot provided/displayed by the system of the present invention, said screenshot including a depiction of received CPDLC message content and a request non-acceptance reason given window overlaid onto an application depiction/updated application depiction in accordance with an exemplary embodiment of the present invention.

In further embodiments, the method 700 may further include receiving a user input responsive to the request 710. As mentioned above, the user of the system 100 may respond to the ATC request by providing an input/making a selection from the list of responses (WILCO, UNABLE, STANDBY) via a user input device 108, touch screen of the display 106, etc. The method 700 may further include, based on the received user input responsive to the request, providing a response CPDLC message from the aircraft system 100 to the remote system 712. In embodiments in which the response CPDLC message is a request acceptance message/when the received user input responsive to the ATC request is an acceptance, the method 700 may further include providing a proposed flight route confirmation prompt 714 (as shown in the screenshot 400 illustrated in FIG. 4). The proposed flight route confirmation prompt 224 may be established such that it allows the user to accept ("Execute") or reject ("Cancel") the proposed flight route 222. For example, the proposed flight route confirmation prompt/graphic 224 may include check boxes, buttons, or the like, each associated with a response to said flight route confirmation prompt 224, as shown in FIG. 4.

In embodiments in which the response CPDLC message is a request non-acceptance message (as shown in the screenshot 500 illustrated in FIG. 5), the method 700 may further include providing a request non-acceptance reason prompt which prompts the user to perform at least one of the following actions: select/provide, via user-provided input, a reason for non-acceptance from a list/menu (said list/menu 226 provided via said request non-acceptance reason prompt 228 and including a plurality of reasons for non-acceptance); and provide a reason for non-acceptance via text entry input into a text entry field provided via the request non-acceptance reason prompt 716. For instance, the reasons for non-acceptance/non-compliance provided in the menu 226 may include: aircraft performance, weather, or the like. Further, the text entry field 230 may allow the user of the system 100 to provide a different reason, or to elaborate on the reason selected by providing a text entry input.

In further embodiments, the method 700 may further include the step of receiving a user input responsive to the proposed flight route confirmation prompt 718. When the received user input responsive to the proposed flight route confirmation prompt is a proposed flight route acceptance, the method 700 may further include transmitting a proposed flight route acceptance CPDLC response message from the aircraft system to the remote system 720. If the proposed flight route 222 is accepted, it may remain displayed via the application depiction/via future updated application depictions (as the updated, planned flight route), and the previous planned flight route/planned flight route graphic may be no longer displayed in the application depictions. Alternatively, when the received user input responsive to the proposed flight route confirmation prompt is a proposed flight route non-acceptance, the method 700 may further include transmitting a proposed flight route non-acceptance CPDLC response message from the aircraft system to the remote system 722.

In additional embodiments, when a user input responsive to the request non-acceptance reason prompt has been provided by the user of the system 100 and received by said system 100, the method 700 may further include transmitting a request non-acceptance reason CPDLC response message from the aircraft system to the remote system 724. For example, the user may provide a user input/select a displayed SEND MESSAGE button/graphic which may cause the system 100 to transmit the request non-acceptance reason CPDLC response message/follow-up response CPDLC message (including the reason for non-compliance with the ATC request) to the remote system. The method 700 may further include providing a reason given window, indicating to the user the reason included in the follow-up response CPDLC message which was sent to the remote system 726. The reason given window 232 (as shown in the screenshot 600 illustrated in FIG. 6) may then automatically close after being displayed (such as after being displayed for a few seconds), or may be manually closed by the user, so as not to occlude the application depiction 202/220.

Further, when: a) the received user input responsive to the ATC request is an acceptance/when the response CPDLC message is a request acceptance message; and b) the proposed flight route is accepted by the user, the method 700 may further include automatically reducing/minimizing/shrinking/closing/removing one or more of: the flight route confirmation prompt 224, the CPDLC content depiction 210, and the alert indicator 206, until a new CPDLC message is received 728. In this way, the user's view of the application depiction 202/220 is maximized until a new CPDLC message is received, at which time, the alert indicator 206 may re-appear, and one or more of the above-referenced steps may be repeated, with the CPDLC content depiction 210 and/or the flight route confirmation prompt 224 re-opening/re-expanding/re-appearing.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, cursor control devices, touch screens, and the like) may be coupled to the system either directly or through intervening I/O controllers.

Network adapters may also be coupled to the system to enable the data processing system to become coupled to other data processing systems or storage devices through intervening private or public networks. Modems, cable modem and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for integrating information from a controller to pilot data link communication (CPDLC) message into a flight path function of an aircraft, said method comprising:

receiving a CPDLC message from a remote CPDLC communication system, the CPDLC message comprising message history and a proposed flight route, the remote CPDLC communication system being communicatively coupled with the aircraft, the proposed flight route comprising a modification to a current flight path graphically depicted in the aircraft or a request to alter the current flight path;

providing an alert to a user of the aircraft regarding the CPDLC message received; and generating a graphical overlay comprising the proposed flight route to update the graphically depicted current flight path with the modification or a textual depiction of the request, the update being based on the CPDLC message being a current CPDLC message, wherein the graphical overlay does not occlude the graphical depiction of the current flight path.

2. The method of claim 1, wherein the CPDLC message history includes a time the message is received at the aircraft and the CPDLC message is determined to be the current CPDLC message based on the time.

3. The method of claim 1, further comprising:

updating the graphical overlay in real-time with information associated with one or more aircraft inputs or user inputs received after receipt of the CPDLC message.

4. The method of claim 3, wherein the response to the alert is a first user input and the updating occurs after receipt of the first user input or a second user input.

5. The method of claim 3, wherein the aircraft further comprises one of a Synthetic Vision Systems (SVS) system and a Future Air Navigation System (FANS) functionality, and wherein the information associated with the one or more aircraft inputs comprises data associated with one of: an aircraft sensor, an antenna, a Global Positioning System (GPS) device, and an Inertial Reference System device.

6. The method of claim 1, wherein the proposed flight route comprises the modification and the request to alter the current flight path, the method further comprising:

receiving a user input responsive to the request to alter the current flight path; and based on the received user input responsive to the request, providing a response CPDLC message from the aircraft system to the remote system.

7. The method of claim 6, further comprising:

when the response CPDLC message is a request acceptance message, providing a proposed flight route confirmation prompt.

8. The method of claim 6, further comprising:

when the response CPDLC message is a request non-acceptance message, providing a request non-acceptance reason prompt which prompts the user to at least one of: select, via user-provided input, a reason for non-acceptance from a list including a plurality of reasons for non-acceptance provided via the request non-acceptance reason prompt; and provide a reason for non-acceptance via text entry input into a text entry field provided via the request non-acceptance reason prompt.

9. The method of claim 1, wherein the CPDLC message is an Air Traffic Control (ATC) message.

10. The method of claim 1, wherein the alert is provided via a Crew Alerting System (CAS) graphical indicator.

11. The method of claim 1, wherein providing the alert includes providing an aural indication that the CPDLC message has been received by an aircraft flight deck situational awareness communication system.

12. The method of claim 1, wherein the current flight path is incorporated with a graphical depiction of a map, and wherein the proposed flight route graphical overlay includes a graphical indicator positioned to overlay the map or a portion thereof so as not to occlude the current flight path.

13. The method of claim 1, wherein upon receipt of a user input responsive to the alert via a flight deck situational awareness communication system of the aircraft, the graphical depiction of the current flight path is updated with the proposed flight route graphical overlay.

14. The method of claim 1, further comprising:

removing the proposed flight route graphical overlay and any indicators associated with the alert and corresponding CPDLC message to maximize the application depiction.

15. A flight deck situational awareness communication system for integrating information from a controller to pilot data link communication (CPDLC) message into a flight path function for an aircraft, said system comprising:

a memory configured for receiving and storing a CPDLC message from a remote CPDLC communication system, the remote CPDLC communication system being communicatively coupled with the aircraft;

a processor configured for being communicatively coupled with the memory, the processor further configured for receiving the CPDLC message stored in the memory, the processor further configured for implementing electronic instructions, the electronic instructions comprising steps of a method, the method comprising:

receiving a CPDLC message from a remote CPDLC communication system, the CPDLC message comprising message history and a proposed flight route, the proposed flight route comprising a modification to a current flight path graphically depicted in the aircraft or a request to alter the current flight path;

providing an alert to a user of the aircraft regarding the CPDLC message received;

generating an image, said image including a depiction of information contained in the CPDLC message including the proposed flight route to update the graphically depicted current flight path with the modification or a textual depiction of the request to alter the current flight path, the update being based on the CPDLC message being a current CPDLC message, the image being generated to overlay but not occlude the graphical depiction of the current flight path.

* * * * *